(12) United States Patent
Chen

(10) Patent No.: US 7,433,497 B2
(45) Date of Patent: Oct. 7, 2008

(54) STABILIZING A SEQUENCE OF IMAGE FRAMES

(75) Inventor: Mei Chen, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 689 days.

(21) Appl. No.: 10/763,791

(22) Filed: Jan. 23, 2004

(65) Prior Publication Data

US 2005/0163348 A1 Jul. 28, 2005

(51) Int. Cl.
*G06K 9/00* (2006.01)

(52) U.S. Cl. ............................. 382/107; 382/225

(58) Field of Classification Search ................. 382/107, 382/164; 348/208.99; 375/240
See application file for complete search history.

(56) References Cited

U.S. PATENT DOCUMENTS

| | | | |
|---|---|---|---|
| 5,053,875 A * | 10/1991 | Ishii et al. | 348/208.99 |
| 5,157,732 A * | 10/1992 | Ishii et al. | 382/107 |
| 5,557,684 A | 9/1996 | Wang et al. | |
| 5,847,755 A * | 12/1998 | Wixson et al. | 348/149 |
| 5,973,733 A | 10/1999 | Gove | |
| 6,385,245 B1 | 5/2002 | De Haan et al. | |
| 6,628,805 B1 | 9/2003 | Hansen et al. | |
| 7,043,058 B2 * | 5/2006 | Cornog et al. | 382/107 |
| 7,142,600 B1 * | 11/2006 | Schonfeld et al. | 375/240.16 |
| 2002/0118761 A1 | 8/2002 | Lee | |
| 2003/0031382 A1 | 2/2003 | Broekaert | |
| 2003/0090593 A1 | 5/2003 | Xiong | |
| 2003/0117611 A1 | 6/2003 | Chon et al. | |
| 2005/0213840 A1 | 9/2005 | Chen | |
| 2007/0132852 A1 * | 6/2007 | Yu | 348/207.99 |

FOREIGN PATENT DOCUMENTS

| | | |
|---|---|---|
| EP | 392671 A2 * | 10/1990 |
| EP | 1117251 | 7/2001 |
| WO | WO99/07156 | 2/1999 |

OTHER PUBLICATIONS

Bernd Heisele, "Motion-Based Object Detection and Tracking in Color Image Sequences," Procedings IEEE 4th International Conference on Image Processing (ICIP-97), vol. III, Oct. 1997.*

M. J. Black and P. Anandan. The robust estimation of multiple motions: Parametric and piecewise-smooth flow fields. Computer Vision and Image Understanding, 63(1):75-104, Jan. 1996.

J. Y. A. Wang and E. H. Adelson. Spatio-Temporal Segmentation of Video Data. Proceedings of SPIE on Image and Video Processing II, vol. 2182, pp. 120-131, San Jose, Feb. 1994.

(Continued)

*Primary Examiner*—Jingge Wu
*Assistant Examiner*—Tsung-Yin Tsai

(57) ABSTRACT

Respective sets of motion vectors are computed for pairs of image frames. The computed motion vectors are classified into motion classes. Motion clusters are identified in the image frames based at least in part on the motion classes. An identified motion cluster is selected as a motion stabilization reference based on spatiotemporal consistency of the selected motion cluster across multiple image frames.

27 Claims, 4 Drawing Sheets

OTHER PUBLICATIONS

Zhu ZhiGang, Xu GuangYou, Yang YuDong, Jin J S. Camera stabilization based on 2.5D motion estimation and inertial motion filtering[A]. IEEE Internaltional Conference on Intelligent Vehicles[C]. Stuttgart, Germany: IEEE, 1998.

Remi Megret, Daniel DeMenthon. A Survey of Spatio-Temporal Grouping Techniques. Research report CS-TR-4403, LAMP, University of Maryland, Aug. 2002.

Gerard G. Medioni, Isaac Cohen, Francois Bremond, Somboon Hongeng, Ramakant Nevatia: Event Detection and Analysis from Video Streams. IEEE Transactions on Pattern Analysis and Machine Intelligence 23(8):873-889 (2001).

David Tweed and Andrew Calway. Moving Object Graphs and Layer Extraction from Image Sequences. In Tim Cootes and Chris Taylor, editors, Proceedings of the British Machine Vision Conference, pp. 133-142. BMVA, Sep. 2001.

J. Y. A. Wang and E. H. Adelson. Layered Representation for Motion Analysis. Proceedings of the IEEE Computer Society Conference on Computer Vision and Pattern Recognition 1993, pp. 361-366, New York, Jun. 1993.

J.-R. Ohm, P. Ma : "Feature-based cluster segmentation of image sequences," Proceedings IEEE 4th International Conference on Image Processing (ICIP-97), vol. III, pp. 178-181, Oct. 1997.

Kang-Sun Choi, et al.: "An Efficient Digital Image . . . "; IEEE, Piscataway, NJ.; Jun. 15, 2000; pp. 246-247; XP002326257.

Hansen, M., et al.: "Real-Time Scene Stabilization . . . "; Image Understanding Workshop; Nov. 1994; pp. 457-465; XP000852887.

\* cited by examiner

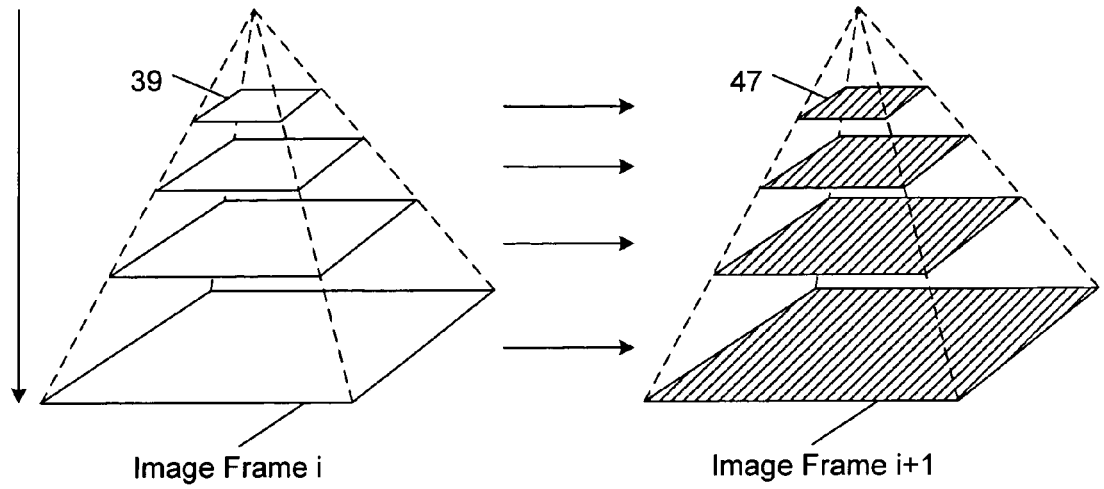
Increasing Image Frame Resolution
Image Frame i
FIG. 6A
Image Frame i+1
FIG. 6B
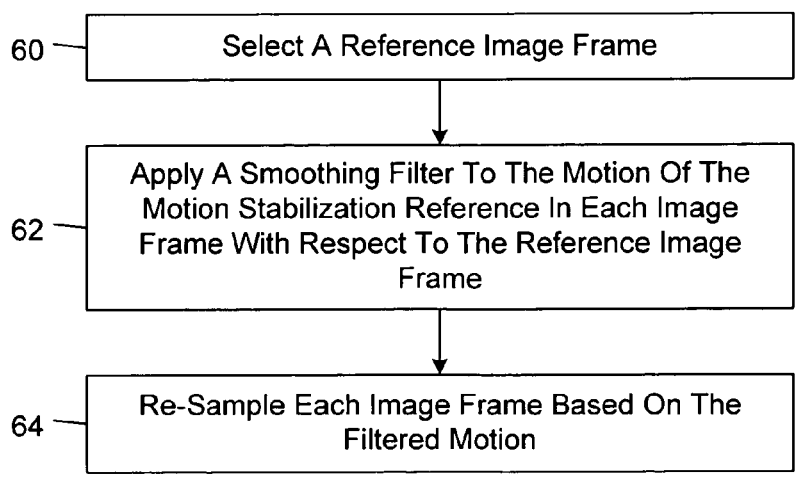
FIG. 7

STABILIZING A SEQUENCE OF IMAGE FRAMES

TECHNICAL FIELD

This invention relates to systems and methods of stabilizing a sequence of image frames.

BACKGROUND

Image stabilization techniques have been used in a wide variety of different applications, including surveillance applications, vehicle-mounted image sensor applications, robotics applications, and consumer electronics applications. Image stabilization is the process of eliminating or at least reducing the effects of unwanted image sensor motion (e.g., unwanted image sensor vibration or irregular image sensor motion) on pictures or video sequences. Many image stabilization approaches attempt to eliminate or at least reduce the amount of unwanted image sensor motion relative to a scene while preserving any intentional image sensor motion. In this regard, these image stabilization techniques synthesize a new image or video sequence from the perspective of a stabilized image sensor trajectory.

Among the primary classes of image stabilization techniques are mechanical image stabilization methods, electro-mechanical image stabilization methods, optical image stabilization methods, and electronic image stabilization methods. Mechanical image stabilization systems attempt to dampen the motion of the image sensor (or just the lens/image sensor subsystem). Electromechanical image stabilization systems detect motion of the image sensor and alter the position or orientation of the image sensor to offset the detected image sensor motion. Optical image stabilization approaches stabilize the image of the sensor by displacing the image as it is formed by the lens system in a way that offsets image sensor motion. Electronic image stabilization techniques involve modifying the captured images in ways that makes the captured images appear to have been captured by a more stable image sensor.

In some common electronic image stabilization techniques, the motion of an image sensor is estimated and mapped to a model of unwanted image sensor motions (e.g., unwanted jittering, panning, zooming, and tilting of the image sensor) over the time images are captured. Each image frame is transformed based on the image sensor motion model to generate a synthesized video sequence that is stabilized relative to the image sensor motion model. In many of these image sequence stabilization approaches, the image sensor motion model describes the motion of the image sensor relative to a spatially dominant component of the scene that is assumed to correspond to a stationary component of the scene, such as the background. Oftentimes, however, the spatially dominant component of the scene corresponds to a moving object (e.g., a child running in front of the image sensor), in which case the motion model describes the motion of the image sensor relative to a moving object, leading to undesirable stabilization results.

SUMMARY

The invention features methods, systems, and machine-readable media for processing a sequence of image frames.

In one aspect of the invention, respective sets of motion vectors are computed for pairs of image frames. The computed motion vectors are classified into motion classes. Motion clusters are identified in the image frames based at least in part on the motion classes. An identified motion cluster is selected as a motion stabilization reference based on spatiotemporal consistency of the selected motion cluster across multiple image frames.

Other features and advantages of the invention will become apparent from the following description, including the drawings and the claims.

DESCRIPTION OF DRAWINGS

FIGS. 6A and 6B are diagrammatic views of projections from a multiresolution representation of an image frame to a corresponding multiresolution representation of a neighboring image frame in accordance with an embodiment of a method of stabilizing a sequence of image frames.

FIG. 7 is a flow diagram of an embodiment of a method of stabilizing a sequence of image frames based on a selected motion stabilization reference.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

The image processing embodiments described below incorporate a robust approach to decouple image sensor motion from in-scene object motion based on analysis of the spatiotemporal characteristics of different image regions. In this way, these embodiments are able to remove or at least reduce unwanted image sensor motion with high accuracy.

Figure 1:
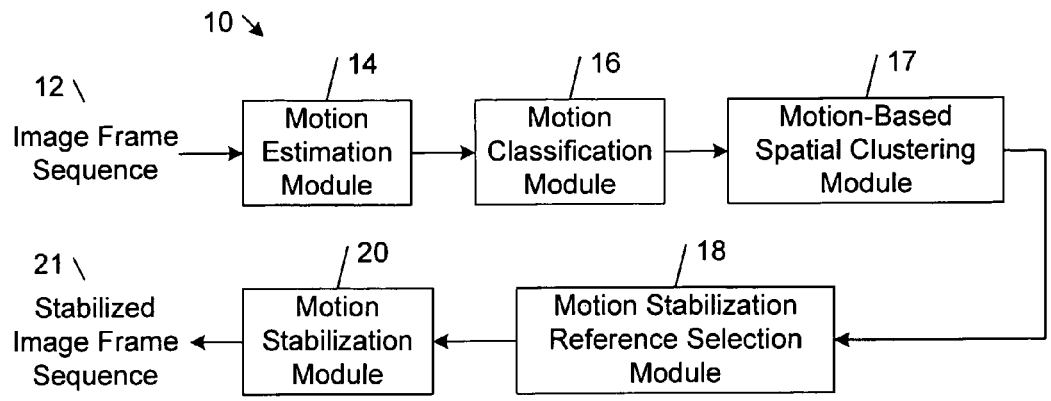
FIG. 1 is a block diagram of an embodiment of a system for stabilizing a sequence of image frames.

FIG. 1 shows an embodiment of a system 10 for processing a sequence of image frames 12 that includes a motion estimation module 14, a motion classification module 16, a motion-based spatial clustering module 17, a motion stabilization reference selection module 18, and a motion stabilization module 20. The image frame sequence 12 may correspond to an original image frame sequence captured by an image sensor or a processed version of such an original image frame sequence. For example, the image frame sequence 12 may consist of a sampling of the image frames of an original image frame sequence captured by an image sensor or a compressed or reduced-resolution version of an original image frame sequence captured by an image sensor.

As explained in detail below, image processing system 10 identifies in the image frame sequence 12 a motion stabilization reference, which is a temporally persistent feature appearing in the image frame sequence 12 that is determined to correspond to a stationary or background component appearing in the image frames. The image processing system 10 generates a motion model of the motion stabilization reference and synthesizes an image frame sequence 21 corresponding to the input image frame sequence 12, but stabilized based on the motion model generated for the identified motion stabilization reference. In general, the modules 14-20 of system 10 are not limited to any particular hardware or software configuration, but rather they may be implemented in any computing or processing environment, including in digital electronic circuitry or in computer hardware, firmware, device driver, or software. For example, in some implementations, these modules 14-20 may be embedded in the hardware of any one of a wide variety of digital and analog electronic devices, including digital still image cameras, digital video cameras, printers, and portable electronic devices (e.g., mobile phones and personal digital assistants).

Motion estimation module 14 computes respective sets of motion vectors for pairs of successive image frames in sequence 12. The motion vectors estimate the inter-frame motion of features or objects appearing in the image frames. In general, motion estimation module 14 may compute motion vectors based on any model for estimating the motion of image objects. For example, motion vectors may be computed based on an affine motion model that describes motions that typically appear in image sequences, including translation, rotation, zoom, and shear. Affine motion is parameterized by six parameters as follows:

$$V_x(x,y) = a_{x0} + a_{x1}x + a_{x2}y \quad (1)$$

$$V_y(x,y) = a_{y0} + a_{y1}x + a_{y2}y \quad (2)$$

wherein $V_x(x,y)$ and $V_y(x,y)$ are the x and y components of a velocity motion vector at point (x,y), respectively, and the $a_k$'s are the affine motion parameters.

Figure 2A:
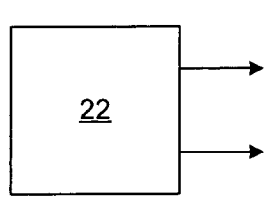
FIGS. 2A-2D are diagrammatic views of different respective motions that typically appear in dynamic images.
Figure 2B:
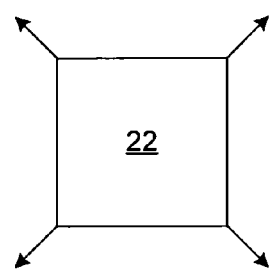
Figure 2C:
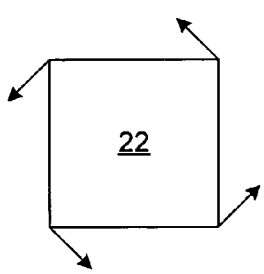
Figure 2D:
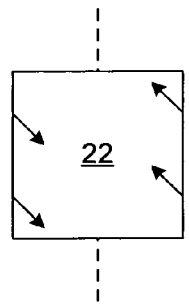

Examples of an affine motion model are illustrated in FIGS. 2A-2D. FIG. 2A shows parallel motion vectors that represent a translation of an object 22 at a constant distance from an image sensor (or image sensors). FIG. 2B shows vectors having a common focus of expansion that represent translation of object 22 in depth relative to the image sensor, or zooming (uniform scaling) motion. FIG. 2C shows concentric motion vectors that represent rotation of object 22 within the imaging plane. FIG. 2D represents rotation of object 22 with respect to Y axis.

In some embodiments, motion estimation module 14 computes movements of individual pixels or groups of pixels from a given image frame to a neighboring image frame based on an optical flow model (or dense motion model) of the base image. The motion estimates may be computed for one or both of forward and backwards transitions in time (i.e., from an earlier-captured image frame to a later-captured image frame, or from a later-captured image frame to an earlier-captured image frame). As used herein, the term "neighboring image frames" refers to adjacent image frames in an image frame sequence without regard to the temporal ordering of the neighboring image frames in terms of capture time. In addition, the term "successive image frames" refers to adjacent image frames in an image frame sequence that may be ordered chronologically or reverse-chronologically in terms of capture time.

In an optical flow model, the movements are represented by velocity vectors (dx/dt, dy/dt) that describe how quickly a pixel (or a group of pixels) is moving across an image, and the direction of pixel movement. The optical flow model represents a projection of three-dimensional object motion onto the image sensor's two-dimensional image plane. Any one of a wide variety of standard optical flow computation methods may be used by the motion estimation module 14 to compute motion vectors. In some implementations, a multi-scale coarse-to-fine algorithm based on a gradient approach may be used to compute the optical flow motion vectors.

Motion classification module 16 classifies the motion vectors computed by the motion estimation module 14 into motion classes, which represent different respective motions of different objects appearing in the image frame sequence, including independently moving objects and the stationary or background object. In some embodiments, motion classification module 16 groups the computed motion vectors based on a measure of distance (d(V,V')) between motion vectors (V and V') and the difference between their directions. In some implementations, the distance measure corresponds to the L2 (or Euclidean) norm, which is computed as follows for the case where V and V' are motion vectors defined with respect to the affine motion model of equations (1) and (2) above with parameters $a_k$ and $a'_k$, respectively:

$$d(V, V') = \sqrt{\sum_{m=x,y} \sum_{i=0}^{2} (a_{mi} - a'_{mi})^2} \quad (3)$$

Motion classification module 16 may classify motion vectors in each image frame into a respective set of motion classes using any type of classification method. For example, in some implementations, motion vectors in each image frame are classified in accordance with a k-means clustering method. In these implementations, either the number of clusters or a set of clusters representing an initial partition between motion vectors in a give image frame may be pre-determined. The partition is refined iteratively by assigning pixels to each partition and re-computing the center of each cluster. The algorithm iterates between two simple steps:

1. Compute cluster centroids and use them as new cluster seeds; and
2. Assign each object to the nearest seed.

Figure 3:
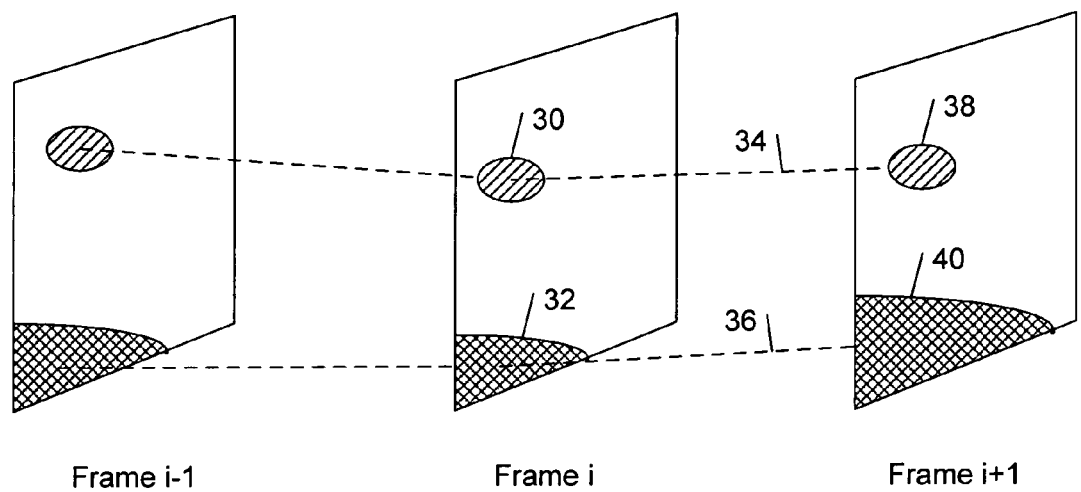
FIG. 3 is a diagrammatic view of a mapping between motion clusters corresponding to objects appearing in series of three successive image frames of an image frame sequence in accordance with an embodiment of a method of stabilizing a sequence of image frames.
Figure 4:
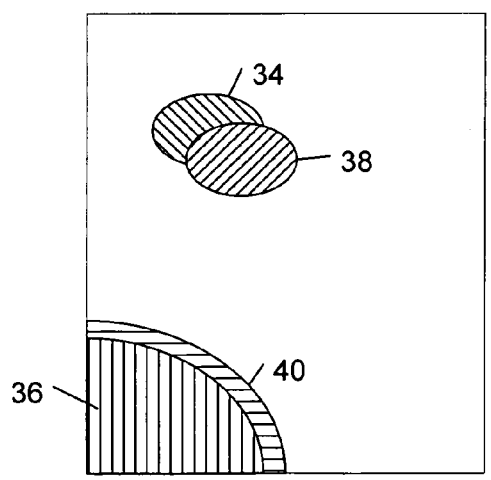
FIG. 4 is a diagrammatic view of objects appearing in a pair of successive image frames in the image frame sequence of FIG. 3 superimposed in a common image frame.

In some implementations, the final partition corresponds to a respective set of motion clusters for each image frame in which the total distance between pixels (or pixel groups) and the centers of their respective clusters is minimized, while the distances between clusters are maximized Referring to FIGS. 3 and 4, motion-based spatial clustering module 17 identifies objects (or components) in the image frames based at least in part on the sets of motion clusters generated by motion classification module 16. In some embodiments, a parametric motion model (e.g., an affine motion model) is computed for each motion cluster 30, 32 in a given image frame i. In one embodiment, the motion within a cluster is modeled as an affine transformation. In this approach, affine motion parameters are computed using a robust M-estimation regression technique that is applied to a local motion field (e.g. optical flow) to make the computation insensitive to outliers resulting from multiple motions. The approach estimates a dominant motion for the cluster and detects points that are not moving consistently with the dominant motion. Optionally, additional motions can be estimated using these outliers.

The motion estimation method operates as a plane fitting algorithm in the velocity space since the affine model is a linear model of local motion. The above-mentioned M-estimation regression technique is applied separately on each velocity component of each motion vector since the components are independent. Assuming that $H_i$ is the $i^{th}$ hypothesis vector in the affine parameter space with x and y components $H_{xi}$ and $H_{yi}$, and $\phi$ is the regressor vector given by:

$$H_i=[H_{yi},H_{xi}] \quad (4)$$

$$H_{xi}{}^T=[a_{x0i},a_{x1i},a_{x2i}] \quad (5)$$

$$H_{yi}{}^T=[a_{y0i},a_{y1i},a_{y2i}] \quad (6)$$

$$\phi^T=[1,x,y] \quad (7)$$

then a linear least squares estimate of $H_t$ for an given local motion field is as follows:

$$[H_{yi},H_{xi}]=[\Sigma_{Pi}\phi\phi^T]^{-1}\Sigma_{Pi}(\phi^T[V_y(x,y)\ V_x(x,y)]) \quad (8)$$

where Pi is the $i^{th}$ cluster in the image frame.

Next, each motion cluster 30, 32 is projected into at least one neighboring image frame (e.g., image frame i+1) based on the computed parametric motion models. A measure of spatiotemporal consistency is computed between the projected clusters 34, 36 and the original clusters 38, 40 in the neighboring image frame. As used herein, "spatiotemporal consistency" refers to the persistence of an object cluster in the same spatial region across multiple image frames of an image frame sequence, after accounting for inter-frame motion. In some implementations, the spatiotemporal consistency of a given cluster (e.g., cluster 30) in a given image frame (e.g., image frame i) is measured by the degree of overlap between the projection of the given cluster (e.g., projected cluster 34) and the original cluster (e.g., cluster 38) in the neighboring image frame (e.g., image frame i+1). In one implementation, the overlap between the original and projected clusters is computed by finding the intersection of the two pixel sets representing the original and projected clusters. Assuming $L^m$ represents a cluster in frame m and $L^n$ represents the projected cluster from frame n based on estimated motion between frame m and frame n, the overlap between cluster $L^m$ and its motion projection $L^n$ is defined as:

$$L^{mn}=L^m \cap L^n \quad (9)$$

The degree of overlap between $L^m$ and $L^n$ is defined as $L^{mn}/L^m$. In the example illustrated in FIG. 4, the degree of overlap between projected cluster 34 and original cluster 38 is approximately 33%, whereas the degree of overlap between projected cluster 36 and original cluster 40 is 90%. The spatiotemporal consistency of each motion cluster in a given image frame may be computed across more than one neighboring image frames in one or both of a chronological direction and a reverse-chronological direction.

In some implementations, the spatiotemporal consistency is determined based on the distance ($\Delta C$) between the centroids of a cluster a and its motion projected counterpart b from a neighboring frame, together with the size difference ($\Delta S$) between them. For example, the mathematical computation of the centroid location $(\hat{x},\hat{y})$ of a cluster region is the average of the positions $(x_i,y_i)$ of the pixels forming that cluster:

$$\hat{x}=\frac{\sum_{i=1}^{N} x_i}{N} \text{ and } \hat{y}=\frac{\sum_{i=1}^{N} y_i}{N} \quad (10)$$

In these implementations, the distance ($\Delta C_{ab}$) between centroids of clusters a and b is measured, for example, by the L2 distance, and the sizes ($S_a$, $S_b$) of clusters a and b are measured by the total number of pixels in them. Clusters a and b are determined to be spatiotemporally consistent if the distance ($\Delta C_{ab}$) between the centroids of clusters a and b is less than or equal to a predetermined distance threshold ($\Delta C_{Threshold}$) and if the percentage size change ($|\Delta S_{ab}|/S_a$) between the sizes ($S_a$, $S_b$) of clusters a and b is less than a predetermined percentage size change threshold (%$\Delta S_{Threshold}$).

Figure 5:
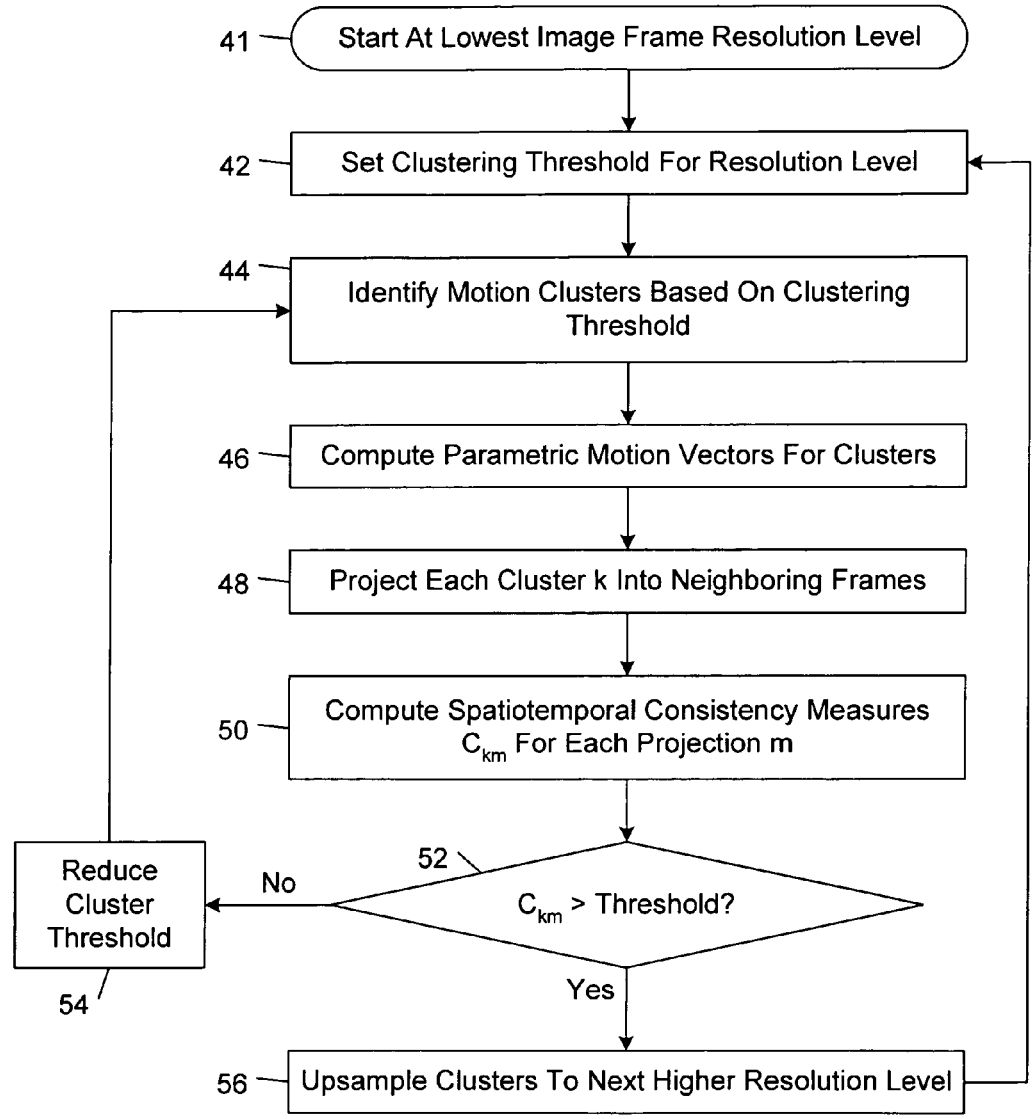
FIG. 5 is a flow diagram of an embodiment of a method of classifying motion vectors into motion classes and motion clusters.

Referring to FIGS. 5, 6A, and 6B, in some embodiments, the motion-based spatial clustering module 17 and the motion classification module 16 iteratively refine the motion clusters in the image frames in a hierarchical way from a coarse image frame resolution to a high image frame resolution. A given image frame i is down-sampled to produce an image pyramid, with image frame 39 at a predetermined lowest resolution level (step 41). An initial, empirically determined clustering threshold is set based on the current image frame resolution level (step 42). Motion clusters are identified based on the clustering threshold (step 44). In some implementations, the motion clusters may be identified in accordance with the k-means clustering approach described above, and parametric motion vectors are computed for each of the identified motion clusters (step 46). Each cluster k in the given image frame 38 is projected into one or more neighboring image frames 47, which have been down-sampled to the current image frame resolution level (step 48). A spatiotemporal consistency measure $C_{km}$ is computed for each projection m of cluster k (step 50). If a spatiotemporal consistency measure $C_{km}$ is less than an empirically determined threshold (step 52), the clustering threshold is adjusted (step 54) and the motion clustering process is repeated at the current image frame resolution level until the consistency measures $C_{km}$ are greater than or equal to the empirically determined threshold (steps 44-52). After a set of motion clusters that have consistency measures $C_{km}$ greater than or equal to the empirically determined threshold is generated (step 52), the motion clusters are warped (or up-sampled) to the next higher resolution level (step 56) and the process is repeated (steps 42-56) to refine the clustering.

In some implementations of the method shown in FIG. 5, the warped motion clusters are adjusted only when a spatiotemporal consistency measure $C_{km}$ is less than the empirically determined threshold for the current image frame resolution (step 52). In this way, the speed of the motion-based spatial clustering process may be increased without substantially compromising the accuracy of the final clustering results.

Motion stabilization reference selection module 18 selects as the motion stabilization reference the most temporally persistent motion cluster in the final set of motion clusters that is output from the motion-based spatial clustering module 17. In the above-described embodiments, the most temporally persistent motion cluster corresponds to the motion cluster with the highest computed spatiotemporal consistency measure across multiple image frames. Motion stabilization reference selection module 18 then computes a parametric motion model (e.g., an affine motion model) for the selected motion stabilization reference between each pair of successive frames in the image frame sequence 12.

In general, motion stabilization module 20 produces a stabilized motion estimate based on a smooth filtering of the parametric motion model computed by the motion stabilization reference selection module 18 and corrects the image frame sequence 12 based on the stabilized motion estimate.

Referring to FIG. 7, in some embodiments, motion stabilization module 20 generates the stabilized image frame sequence 21 as follows. Motion stabilization module 20 selects a reference image frame (e.g., the first image frame in sequence 12) (step 60). Motion stabilization module 20 applies a smoothing filter (e.g., an average filter or a Gaussian filter) to the motion of the motion stabilization reference in each image frame of sequence 12 with respect to the reference image frame based on the frame-to-frame parametric motion model computed by the motion stabilization reference selection module 18 (step 62). In some implementations, the motion model is computed by the motion stabilization reference selection module 18 in accordance with the method described above in connection with FIGS. 3 and 4. Different or additional motion filtering techniques may be applied to the motion of the motion stabilization reference to reduce unwanted motion due to shake, vibration, and irregularities. One exemplary adaptive filtering approach for image stabilization is described in copending U.S. application Ser. No. 10/687,681, entitled "Method for Image Stabilization by Adaptive Filtering," which was filed by Mei Chen on Oct. 17, 2003, and is incorporated herein by reference.

Motion stabilization module 20 then re-samples each image frame of sequence 12 based on the filtered motion to produce a motion-stabilized image frame sequence (step 64). In one embodiment, the motion-stabilized image sequence is produced by computing the transformation between the smooth-filtered position of the motion stabilization reference in each image frame and its original position, and re-sampling each image frame using the respective transformation so that its motion stabilization reference is at the smooth-filtered position in the resultant image sequence.

Although systems and methods have been described herein in connection with a particular computing environment, these systems and methods are not limited to any particular hardware or software configuration, but rather they may be implemented in any computing or processing environment, including in digital electronic circuitry or in computer hardware, firmware or software. In general, the component modules of the image processing system may be implemented, in part, in a computer process product tangibly embodied in a machine-readable storage device for execution by a computer processor. In some embodiments, these systems preferably are implemented in a high level procedural or object oriented processing language; however, the algorithms may be implemented in assembly or machine language, if desired. In any case, the processing language may be a compiled or interpreted language. The methods described herein may be performed by a computer processor executing instructions organized, for example, into process modules to carry out these methods by operating on input data and generating output. Suitable processors include, for example, both general and special purpose microprocessors. Generally, a processor receives instructions and data from a read-only memory and/or a random access memory. Storage devices suitable for tangibly embodying computer process instructions include all forms of non-volatile memory, including, for example, semiconductor memory devices, such as EPROM, EEPROM, and flash memory devices; magnetic disks such as internal hard disks and removable disks; magneto-optical disks; and CD-ROM. Any of the foregoing technologies may be supplemented by or incorporated in specially designed ASICs (application-specific integrated circuits).

Other embodiments are within the scope of the claims.

What is claimed is:

1. A machine-implemented method of processing a sequence of image frames, comprising:
   computing respective sets of motion vectors for pairs of the image frames;
   classifying the computed motion vectors into motion classes;
   identifying motion clusters in the image frames based at least in part on the motion classes;
   determining for each of the identified motion clusters a respective spatiotemporal consistency value indicating persistence of the motion cluster in a respective spatial region across neighboring ones of the image frames;
   selecting one of the identified motion clusters as a motion stabilization reference based on the spatiotemporal consistency values;
   determining a motion model describing motion of the motion stabilization reference in the image frame sequence; and
   producing a motion-stabilized version of the sequence of image frames based on the motion model.

2. The method of claim 1, wherein the computing comprises generating for pairs of the image frames respective dense motion models describing motion at pixel locations with respective sets of parameter values in a motion parameter space.

3. The method of claim 2, wherein the identifying comprises iteratively clustering ones of the motion vectors from a coarse image frame resolution level to a fine image frame resolution level.

4. The method of claim 3, wherein at each image frame resolution level ones of the motion vectors are classified into motion clusters, and a respective one of the spatiotemporal consistency values is determined for each of the clusters identified in a given image frame based on a projection of the motion cluster into a neighboring image frame using computed inter-frame motion.

5. The method of claim 3, wherein motion vectors are clustered iteratively in accordance with a clustering method.

6. The method of claim 4, wherein each of the respective spatiotemporal consistency values is determined based on degree of overlap between the respective motion cluster projected from the given image frame and a corresponding one of the motion clusters identified in the neighboring image frame.

7. The method of claim 4, wherein ones of the motion vectors are re-classified with a modified clustering parameter in response to a determination that the respective spatiotemporal consistency values are below a consistency threshold.

8. The method of claim 1, wherein the selecting comprises projecting each motion cluster from image frames to respective neighboring image frames, and computing respective measures of spatiotemporal consistency for the projected motion clusters.

9. The method of claim 1, wherein the selecting comprises selecting as the motion stabilization reference for a given reference image frame the motion cluster having a greater spatiotemporal consistency value than the spatiotemporal consistency values of other ones of the motion clusters across multiple image frames neighboring the given reference image frame.

10. A system for processing a sequence of image frames, comprising:
    a motion estimation module configured to compute respective sets of motion vectors for pairs of image frames;
    a motion classification module configured to classify the computed motion vectors into motion classes;
    a motion-based spatial clustering module configured to
      identify motion clusters in the image frames based at least in part on the motion classes, and
      determine for each of the identified motion clusters a respective spatiotemporal consistency value indicating persistence of the motion cluster in a respective spatial region across neighboring ones of the image frames;

a motion stabilization reference selection module configured to select one of the identified motion clusters as a motion stabilization reference based on the spatiotemporal consistency values; and a motion stabilization module configured to
  determine a motion model describing motion of the motion stabilization reference in the image frame sequence, and
  produce a motion-stabilized version of the sequence of image frames based on the motion model.

11. The system of claim 10, wherein the motion estimation module is configured to compute motion vectors by generating for pairs of the image frames respective dense motion models describing motion at pixel locations with respective sets of parameter values in a motion parameter space.

12. The system of claim 11, wherein the motion-based spatial clustering module is configured to identify motion clusters by iteratively clustering ones of the motion vectors from a coarse image frame resolution level to a fine image frame resolution level.

13. The system of claim 12, wherein at each image frame resolution level ones of the motion vectors are classified by the motion classification module into motion clusters, and a respective one of the spatiotemporal consistency values is determined for each of the clusters in a given image frame based on a projection of the motion cluster into a neighboring image frame using computed inter-frame motion.

14. The system of claim 12, wherein the motion classification module clusters motion vectors iteratively in accordance with a clustering method.

15. The system of claim 13, wherein each of the respective spatiotemporal consistency values is determined based on degree of overlap between the respective motion cluster projected from the given image frame and a corresponding one of the motion clusters identified in the neighboring image frame.

16. The system of claim 13, wherein the motion classification module re-classifies ones of the motion vectors with a modified clustering parameter in response to a determination that the respective spatiotemporal consistency values are below a consistency threshold.

17. The system of claim 10, wherein the motion stabilization reference selection module selects a motion cluster as the motion stabilization reference by projecting each motion cluster from image frames to respective neighboring image frames and computing respective measures of spatiotemporal consistency for the projected motion clusters.

18. The system of claim 10, wherein the motion stabilization reference selection module selects as the motion stabilization reference for a given reference image frame the motion cluster having a greater spatiotemporal consistency value than the spatiotemporal consistency values of other ones of the motion clusters across multiple image frames neighboring the given reference image frame.

19. A machine-readable medium storing machine-readable instructions for causing a machine to perform operations comprising:
  computing respective sets of motion vectors for pairs of image frames;
  classifying the computed motion vectors into motion classes;
  identifying motion clusters in the image frames based at least in part on the motion classes;
  determining for each of the identified motion clusters a respective spatiotemporal consistency value indicating persistence of the motion cluster in a respective spatial region across neighboring ones of the image frames;
  selecting one of the identified motion clusters as a motion stabilization reference based on the spatiotemporal consistency values;
  determining a motion model describing motion of the motion stabilization reference in the image frame sequence; and
  producing a motion-stabilized version of the sequence of image frames based on the motion model.

20. The machine-readable medium of claim 19, wherein the machine-readable instructions cause the machine to compute motion vectors by generating for pairs of the image frames respective dense motion models describing motion at pixel locations with respective sets of parameter values in a motion parameter space.

21. The machine-readable medium of claim 20, wherein the machine-readable instructions cause the machine to identify motion clusters by iteratively clustering ones of the motion vectors from a coarse image frame resolution level to a fine image frame resolution level.

22. The machine-readable medium of claim 21, wherein at each image frame resolution level ones of the motion vectors are classified into motion clusters, and a respective one of the spatiotemporal consistency values is determined for each of the clusters in a given image frame based on a projection of the motion cluster into a neighboring image frame using computed inter-frame motion.

23. The machine-readable medium of claim 21, wherein the machine-readable instructions cause the machine to cluster motion vectors iteratively in accordance with a clustering method.

24. The machine-readable medium of claim 22, wherein each of the respective spatiotemporal consistency values is determined based on degree of overlap between the respective motion cluster projected from the given image frame and a corresponding one of the motion clusters identified in the neighboring image frame.

25. The machine-readable medium of claim 22, wherein the machine-readable instructions cause the machine to re-classify ones of the motion vectors with a modified clustering parameter in response to a determination that the respective spatiotemporal consistency values are below a consistency threshold.

26. The machine-readable medium of claim 19, wherein the machine-readable instructions cause the machine to select a motion cluster as the motion stabilization reference by projecting each motion cluster from image frames to respective neighboring image frames and computing respective measures of spatiotemporal consistency for the projected motion clusters.

27. The machine-readable medium of claim 19, wherein the machine-readable instructions cause the machine to select as the motion stabilization reference for a given reference image frame the motion cluster having a greater spatiotemporal consistency value than the spatiotemporal consistency values of other ones of the motion clusters across multiple image frames neighboring the given reference image frame.

* * * * *